US006295484B1

(12) United States Patent
Ojima et al.

(10) Patent No.: US 6,295,484 B1
(45) Date of Patent: Sep. 25, 2001

(54) ROBOT CONTROL METHOD AND DEVICE

(75) Inventors: Masao Ojima; Hirokazu Kariyazaki; Hidenori Tomisaki, all of Fukuoka (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/424,561

(22) PCT Filed: May 26, 1998

(86) PCT No.: PCT/JP98/02284

§ 371 Date: Nov. 24, 1999

§ 102(e) Date: Nov. 24, 1999

(87) PCT Pub. No.: WO98/53962

PCT Pub. Date: Dec. 3, 1998

(30) Foreign Application Priority Data

May 28, 1997 (JP) .................................................. 9-138543

(51) Int. Cl.[7] .................................................. G06F 19/00
(52) U.S. Cl. .................. 700/245; 700/249; 700/250; 700/253; 700/256; 700/258; 700/260; 700/261; 700/262; 318/568.11; 318/568.14; 318/568.15; 318/568.16; 318/568.17; 318/568.18; 318/568.19; 701/23; 901/50; 901/23; 901/35
(58) Field of Search .................. 700/245, 45, 260, 700/261, 249, 250, 253, 256, 262, 82, 252; 318/568.14, 568.15, 568.16, 568.17, 568.18, 568.19, 568.11, 568.2, 568.22, 568, 23, 568.1, 567, 565, 575; 701/23; 600/595; 901/50, 2, 23, 19, 35, 22; 310/14; 414/729

(56) References Cited

U.S. PATENT DOCUMENTS 4,786,847 * 11/1988 Daggett et al. .................... 318/568.2
4,829,219 * 5/1989 Penkar ............................. 318/568.18
4,851,748 * 7/1989 Daggett et al. .................... 318/568.2
4,864,204 * 9/1989 Daggett et al. .................... 318/568.2
4,864,206 * 9/1989 Onaga et al. ..................... 318/568.11
4,868,474 * 9/1989 Lancraft et al. ................... 318/568.2
4,962,338 * 10/1990 Daggett et al. ................... 318/568.11
5,319,789 * 6/1994 Ehlig et al. .......................... 712/228

OTHER PUBLICATIONS

Tsusaka et al., Development of a Fast Assembly Robot Arm with Joint Torque Sensory Feedback Control, 1995, IEEE, pp. 2230–2235.*
Wang et al., Experiments on the Position Control of a One–Link Flexible Robot Arm, 1989, IEEE, 373–377.*

* cited by examiner

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

When a multiaxial robot with a mechanism having spring elements between electric motors of respective axes and robot arms is controlled, the path precision of a tool tip is increased without causing vibrations produced by mechanical interference between axes and high-frequency vibrations of electric motors. A model controller (1) is supplied with position commands $X_{ref\_L}$, $X_{ref\_U}$ with respect to the electric motors and outputs model motor position commands $\theta_{Mm\_L}$, $\theta_{Mm\_U}$, model motor speed commands $\dot{\theta}_{Mm\_L}$, $\dot{\theta}_{Mm\_U}$, and model feed-forward commands $U_{FF\_L}$, $U_{FF\_U}$ to feedback controllers (10$_L$, 10$_U$) which actuate and control the electric motors and the robot arms. The model controller (1) includes therein corrective quantity calculators (3$_L$, 3$_U$) for calculating corrective quantities (corrective torques) in view of interfering forces acting between the axes from the other axes to cancel the interfering forces. The model controller (1) outputs the model feed-forward commands with the corrective quantities added thereto.

5 Claims, 2 Drawing Sheets

ROBOT CONTROL METHOD AND DEVICE

TECHNICAL FIELD

The present invention relates to a robot control device for controlling a multiaxial robot such as an industrial robot, and more particularly to a method of and a device for controlling a robot to suppress vibrations produced by mechanical interference between axes.

BACKGROUND ART

Generally, industrial robots whose axes are controlled by electric motors actuate arms under loads via gears of a harmonic drive or the like having a large speed reduction ratio in order to compensate for a power shortage of the electric motors and minimize the effect of disturbing forces from the loads. Because of the intermediary gears with the large speed reduction ratio, mechanical interference between control axes has heretofore not posed significant problems. However, recent growing demands for high-speed and high-precision robot operation focus on problems caused by a mechanical effect that cannot be compensate for by a PI (proportional plus integral) control process and disturbance that cannot be ignored even though the arm is actuated with the high speed reduction ratio.

The present applicant has already proposed an invention disclosed in Japanese laid-open patent application No. Hei 9-222910 (JP, A, 09222910), relating to a method of suppressing vibrations due to axis interference in a multiaxial robot with a mechanism having spring elements such as speed reducers between electric motors of respective axes and robot arms. According to the invention disclosed in Japanese laid-open patent application No. Hei 9-222910, state observers associated with the axes of the multiaxial robot predict torsion angles between the electric motors and loads, and interfering forces are calculated using the predicted torsion angles. Based on the interfering forces, corrective torques are determined, added to the torques of the electric motors, and outputted.

In the control method disclosed in Japanese laid-open patent application No. Hei 9-222910, however, the values of the torsion angles predicted by the state observers are differentiated to calculate the corrective torques. Therefore, noise tends to be introduced into the corrective torques, causing the electric motors to produce high-frequency vibrations and large sounds in operation.

DISCLOSURE OF THE INVENTION

It is an object of the present invention to provide a robot control method to increase the path precision of a tool tip without causing vibrations produced by mechanical interference between axes and high-frequency vibrations of electric motors.

Another object of the present invention is to provide a robot control device to increase the path precision of a tool tip without causing vibrations produced by mechanical interference between axes and high-frequency vibrations of electric motors.

The first-mentioned object of the present invention can be achieved by a method of controlling, as an object to be controlled, a multiaxial robot including a mechanism which has spring elements between electric motors of respective axes and robot arms, comprising the steps of providing a pseudo-model of the object to be controlled and a feedback control system for the object to be controlled, calculating model motor position commands, model motor speed commands, and model feed-forward commands for the respective axes, using the pseudo-model, upon being supplied with position commands for the respective electric motors, determining interfering torques due to interference acting between the axes from the other axes, using the pseudo-model, and calculating model corrective torques to cancel the interfering torques, adding the model corrective torques to the model feed-forward commands to produce final model motor acceleration commands, and executing a feedback control process for the axes depending on the model motor position commands, the model motor speed commands, and the final model motor acceleration commands.

The other object of the present invention can be achieved by an apparatus for controlling a multiaxial robot including a mechanism which has spring elements between electric motors of respective axes and robot arms, comprising a model controller for being supplied with position commands for the respective electric motors and calculating model motor position commands, model motor speed commands, and model feed-forward commands for the respective axes, and feedback controllers for actuating and controlling the electric motors and the robot arms based on the commands outputted from the model controller, the model controller having corrective quantity calculators for determining interfering torques due to interference acting between the axes from the other axes and calculating model corrective torques to cancel the interfering torques, whereby the model controller outputs the model feed-forward commands with the model corrective torques added thereto.

For calculating corrective quantities in the present invention, interfering torques can be calculated from model torsion angles which are positional differences between model motors and model robot arms.

According to the present invention, an interfering force which a certain axis of the robot receives from another axis is determined as an interfering torque, and corrected by the model controller. Standard state quantities based on the corrective quantities (corrective torques) are supplied to the feedback controllers. Since the corrective quantities for canceling the interfering forces are calculated using quantities in a model, e.g., model torsion angles, no noise components are added to the corrective quantities even when differential calculations are performed. Therefore, high-frequency vibrations of the electric motors and sounds produced thereby during their operation are prevented from increasing, and the path precision of a robot tool is improved.

BEST MODE FOR CARRYING OUT THE INVENTION

An embodiment of the present invention will be described below with reference to the drawings. While the embodiment is concerned with a two-axis robot for the ease of illustration, the present invention is also applicable to a multiaxial robot such as a robot with three axes or more by expanding the following description to the corresponding number of axes as can easily be understood by those skilled in the art. It is assumed here that the two axes are represented by an L-axis and a U-axis, commands and quantities relative to the L-axis are represented by variables indicative of those commands and quantities with a suffix "_L", and commands and quantities relative to the U-axis are similarly represented by variables indicative of those commands and quantities with a suffix "_U".

Figure 1:
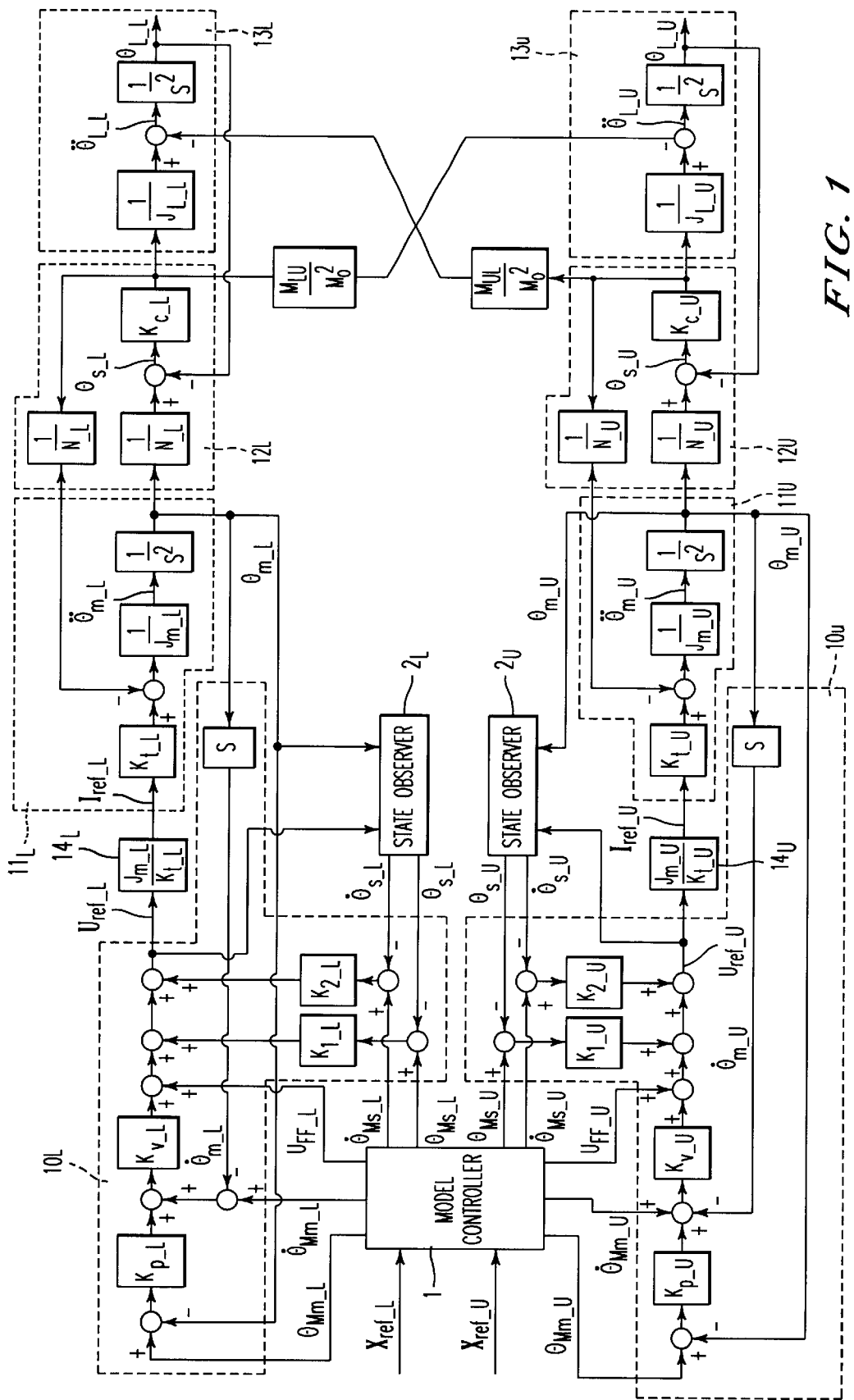
FIG. 1 is a control block diagram of a robot control apparatus according to an embodiment of the present invention.

FIG. 1 shows a basic arrangement of a robot control system which approximates a two-inertia system for each axis. The two-mass system comprises electric motors $11_L$, $11_U$, spring elements such as speed reducers $12_L$, $12_U$, and robot arms $13_L$, $13_U$. It is assumed that respective torque constants of electric motors $11_L$, $11_U$ are represented by $K_{t\_L}$, $K_{t\_U}$, respective actual positions of electric motors $11_L$, $11_U$ of the respective axes by $\theta_{m\_L}$, $\theta_{m\_U}$, respective actual speeds of the electric motors by $\dot{\theta}_{m\_L}$, $\dot{\theta}_{m\_U}$, respective actual accelerations of the electric motors by $\ddot{\theta}_{m\_L}$, $\ddot{\theta}_{m\_U}$, respective speed reduction ratios of speed reducers $12_L$, $12_U$ by $N\_L$, $N\_U$, respective spring constants of the speed reducers by $K_{c\_L}$, $K_{c\_U}$, respective inertial moments of arms $13_L$, $13_U$ by $J_{L\_L}$, $J_{L\_U}$, respective actual positions of the arms by $\theta_{L\_L}$, $\theta_{L\_U}$, and respective accelerations of the arms, i.e., respective accelerations of loads, by $\ddot{\theta}_{L\_L}$, $\ddot{\theta}_{L\_U}$.

It is also assumed that in order to express interference between the U-axis and the L-axis, the load torque of the L-axis is multiplied by the value of $M_{LU}/M_o^2$ determined by the mass of the robot arms and the angle between the both axes and acts on the load acceleration of the U-axis, and similarly, the load torque of the U-axis is multiplied by the value of $M_{UL}/M_o^2$ and acts on the load acceleration of the L-axis.

Electric motors $11_L$, $11_U$ are associated with respective sensors (not shown), which output the actual positions of electric motors $11_L$, $11_U$.

A robot control apparatus controls the L-axis and the U-axis based respectively on motor position commands $X_{ref\_L}$, $X_{ref\_U}$ of the respective axes. The robot control apparatus has respective feedback controllers $10_L$, $10_U$ for carrying out a feedback control process on the L-axis and the U-axis, and model controller 1 as a pseudo-model of feedback controllers $10_L$, $10_U$ and objects to be controlled. Model controller 1 is supplied with motor position commands $X_{ref\_L}$, $X_{ref\_U}$, calculates feed-forward commands $U_{FF\_L}$, $U_{FF\_U}$ of the respective axes in view of the dynamics of the robot, effects feed-forward compensation on the acceleration terms of electric motors $11_L$, $11_U$ of the respective axes, and calculates and outputs motor positions $\theta_{Mm\_L}$, $\theta_{Mm\_U}$, motor speeds $\dot{\theta}_{Mm\_L}$, $\dot{\theta}_{Mm\_U}$, torsion angles $\theta_{Ms\_L}$, $\theta_{Ms\_U}$, and angular velocities of torsion $\dot{\theta}_{Ms\_L}$, $\dot{\theta}_{Ms\_U}$ of the respective axes in a standard model. A prefix "model" is hereinafter added to each of elements that are outputted from model controller 1.

In feedback controllers $10_L$, $10_U$, positional gains of the respective axes are represented by $K_{p\_L}$, $K_{p\_U}$, and speed gains of the respective axes by $K_{v\_L}$, $K_{v\_U}$. Feedback controllers $10_L$, $10_U$ output respective final acceleration commands $U_{ref\_L}$, $U_{ref\_U}$ to be given to respective electric motors $11_L$, $11_U$, and acceleration commands $U_{ref\_L}$, $U_{ref\_U}$ are converted to respective current commands $I_{ref\_L}$, $I_{ref\_U}$ by respective drive circuits $14_L$, $14_U$. Electric motors $11_L$, $11_U$ are energized by the respective current commands $I_{ref\_L}$, $I_{ref\_U}$.

The robot control apparatus also has, for the L-axis and the U-axis, respective state observers $2_L$, $2_U$ which are supplied with final acceleration commands $U_{ref\_L}$, $U_{ref\_U}$ for the electric motors and actual positions $\theta_{m\_L}$, $\theta_{m\_U}$ of the electric motors and predict actual torsion angles $\theta_{s\_L}$, $\theta_{s\_U}$ and angular velocities of torsion $\dot{\theta}_{s\_L}$, $\dot{\theta}_{s\_U}$ thereof. State observers $2_L$, $2_U$ may preferably comprise the state observer disclosed in Japanese laid-open patent application No. Hei 9-222910, for example. The values predicted by state observers $2_L$, $2_U$ are outputted respectively to feedback controllers $10_L$, $10_U$.

Feedback controllers $10_L$, $10_U$ multiply the differences between model motor positions $\theta_{Mm\_L}$, $\theta_{Mm\_U}$ outputted from model controller 1 and actual motor positions $\theta_{m\_L}$, $\theta_{m\_U}$ by positional gains $K_{p\_L}$, $K_{p\_U}$ to produce speed commands for the respective axes. To the speed commands thus produced, there are added the differences between model motor speeds $\dot{\theta}_{Mm\_L}$, $\dot{\theta}_{Mm\_U}$ and actual motor speeds $\dot{\theta}_{m\_L}$, $\dot{\theta}_{m\_U}$. The sums are then multiplied by speed gains $K_{v\_L}$, $K_{v\_U}$ thereby producing acceleration commands. To the acceleration commands, there are added (a) feed-forward commands $U_{FF\_L}$, $U_{FF\_U}$ from model controller 1, (b) the products of the differences between model torsion angles $\theta_{Ms\_L}$, $\theta_{Ms\_U}$ and torsion angles $\theta_{s\_L}$, $\theta_{s\_U}$ outputted from state observers $2_L$, $2_U$ and feedback gains $K_{1\_L}$, $K_{1\_U}$, and (c) the products of the differences between model angular velocities of torsion $\dot{\theta}_{Ms\_L}$, $\dot{\theta}_{Ms\_U}$ and angular velocities of torsion $\dot{\theta}_{s\_L}$, $\dot{\theta}_{s\_U}$ outputted from t state observers $2_L$, $2_U$ and feedback gains $K_{2\_L}$, $K_{2\_U}$, thereby producing final motor acceleration commands $U_{ref\_L}$, $U_{ref\_U}$ for the respective axes.

In the above robot control system, based on final motor acceleration commands $U_{ref\_L}$, $U_{ref\_U}$ thus obtained, electric motors $11_L$, $11_U$ of the respective axes are energized to actuate arms $13_L$, $13_U$ of the respective axes via speed reducers $12_L$, $12_U$ which have respective speed reduction ratios $N\_L$, $N\_U$. At this time, as described above, the interfering forces between the axes act on the load accelerations of the respective axes.

Figure 2:
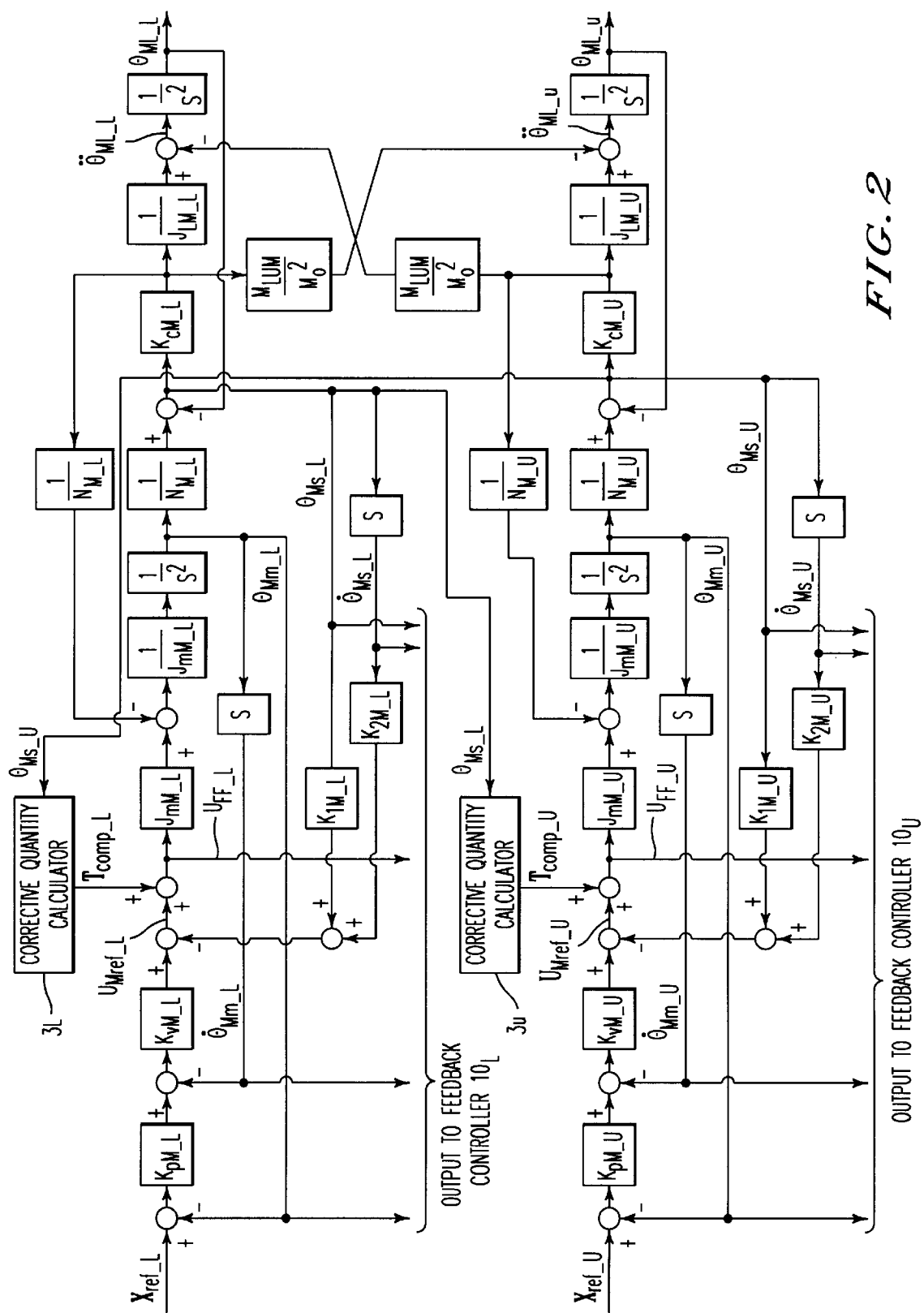
FIG. 2 is a control block diagram of a model controller.

An arrangement of model controller 1 will be described below. FIG. 2 shows in detail the arrangement of model controller 1 which comprises a pseudo-model representing the feedback controllers, the electric motors, the speed reducers, and the robot arms. The positional gains and speed gains of the respective axes in the pseudo-model are model positional gains $K_{pM\_L}$, $K_{pM\_U}$ and model speed gains $K_{vM\_L}$, $K_{vM\_U}$, respectively. Similarly, model motor inertial moments $J_{mM\_L}$, $J_{mM\_U}$, model arm inertial moments $J_{LM\_L}$, $J_{LM\_U}$, model speed reduction ratios $N_{M\_L}$, $N_{M\_U}$, and model speed reducer spring constants $K_{cM\_L}$, $K_{cM\_U}$ are determined as model parameters.

Model controller 1 is supplied with motor position commands $X_{ref\_L}$, $X_{ref\_U}$ of the respective axes, and multiplies the differences between motor position commands $X_{ref\_L}$, $X_{ref\_U}$ and model motor positions $\theta_{Mm\_L}$, $\theta_{Mm\_U}$ by model positional gains $K_{pM\_L}$, $K_{pM\_U}$, thereby producing model speed commands for the respective axes. Model controller 1 multiplies values generated by subtracting model motor speeds $\dot{\theta}_{Mm\_L}$, $\dot{\theta}_{Mm\_U}$ of the respective axes from these model speed commands, by model speed gains $K_{vM\_L}$, $K_{vM\_U}$, thus producing model acceleration commands for the respective axes. Model controller 1 then subtracts, from the model acceleration commands, values produced by multiplying model torsion angles $\theta_{Ms\_L}$, $\theta_{Ms\_U}$ obtained from the model speed reducers by model feedback gains $K_{1M\_L}$, $K_{1M\_U}$, and values produced by multiplying model angular velocities of torsion $\dot{\theta}_{Ms\_L}$, $\dot{\theta}_{Ms\_U}$ obtained when model torsion angles $\theta_{Ms\_L}$, $\theta_{Ms\_U}$ are differentiated, by model feedback gains $K_{2M\_L}$, $K_{2M\_U}$, thereby producing model acceleration commands $U_{Mref\_L}$, $U_{Mref\_U}$. Model acceleration commands $U_{Mref\_L}$, $U_{Mref\_U}$ are applied to model electric motors. Therefore, model acceleration commands $U_{Mref\_L}$, $U_{Mref\_U}$ can be expressed by:

$$U_{Mref\_L} = K_{pM\_L} \cdot K_{vM\_L}(X_{ref\_L} - \theta_{Mm\_L}) - K_{vM\_L} \cdot \theta_{Mm\_L} - K_{1M\_L} \cdot \theta_{Ms\_L} - K_{2M\_L} \cdot \dot{\theta}_{Ms\_L} \quad (1)$$

$$U_{Mref\_U} = K_{pM\_U} \cdot K_{vM\_U}(X_{ref\_U} - \theta_{Mm\_U}) - K_{vM\_U} \cdot \theta_{Mm\_U} - K_{1M\_U} \cdot \theta_{Ms\_U} - K_{2M\_U} \cdot \dot{\theta}_{Ms\_U} \quad (2)$$

With the two-axis robot that is assumed in the embodiment, as described above, because of the interference, the load torque of the L-axis is multiplied by the value of $M_{LUM}/M_{oM}^2$ determined by the mass of the robot arms and the angle between the axes and acts on the load acceleration of the U-axis, and similarly, the load torque of the U-axis is multiplied by the value of $M_{ULM}/M_{oM}^2$ and acts on the load acceleration of the L-axis. If the above interference is recognized as disturbance acting on the arms, then with respect to the L-axis, vibrations of the arm due to the interference can be reduced by adding model corrective torque $T_{comp\_L}$ expressed by the following equation to model motor acceleration command $U_{Mref\_L}$:

$$T_{comp\_L} = -\frac{K_{pM\_L} \cdot K_{vM\_L} \cdot N_{M\_L} \cdot D_{is\_UL}}{K_{cM\_L}} - \frac{K_{vM\_L} \cdot N_{M\_L} \cdot \dot{D}_{is\_UL}}{K_{cM\_L}} - \frac{K_{1M\_L} \cdot D_{is\_UL}}{K_{cM\_L}} - \frac{K_{2M\_L} \cdot \dot{D}_{is\_UL}}{K_{cM\_L}} - \frac{D_{is\_UL}}{J_{mM\_L} \cdot N_{M\_L}} - \frac{N_{M\_L} \cdot \ddot{D}_{is\_UL}}{K_{cM\_L}} \quad (3)$$

where $D_{is\_UL}$ is an interference torque acting from the U-axis on the L-axis, and can be expressed by:

$$D_{is\_UL} = J_{LM\_L} \cdot K_{cM\_L} \cdot \frac{M_{UL\_M}}{M_{oM}^2} \cdot \theta_{Ms\_U} \quad (4)$$

Therefore, final model motor acceleration command $U_{FF\_L}$ is expressed by:

$$U_{FF\_L} = U_{Mref\_L} + T_{comp\_L} \quad (5)$$

and effects feed-forward compensation on the acceleration term of the electric motor. Model controller 1 has corrective quantity calculator $3_L$ which is supplied with model torsion angle $\theta_{Ms\_U}$ for calculating model corrective torque $T_{comp\_L}$ based on equations (3), (4). Model corrective torque $T_{comp\_L}$ from corrective quantity calculator $3_L$ is added to model motor acceleration command $U_{Mref\_L}$.

Likewise, with respect to the U-axis, model corrective torque $T_{comp\_U}$ is expressed as follow:

$$T_{comp\_U} = -\frac{K_{pM\_U} \cdot K_{vM\_U} \cdot N_{M\_U} \cdot D_{is\_LU}}{K_{cM\_U}} - \frac{K_{vM\_U} \cdot N_{M\_U} \cdot \dot{D}_{is\_LU}}{K_{cM\_U}} - \frac{K_{1M\_U} \cdot D_{is\_LU}}{K_{cM\_U}} - \frac{K_{2M\_U} \cdot \dot{D}_{is\_LU}}{K_{cM\_U}} - \frac{D_{is\_LU}}{J_{mM\_U} \cdot N_{M\_U}} - \frac{N_{M\_U} \cdot \ddot{D}_{is\_LU}}{K_{cM\_U}} \quad (6)$$

where $D_{is\_LU}$ is an interference torque acting from the L-axis on the U-axis, and can be expressed by:

$$D_{is\_LU} = J_{LM\_U} \cdot K_{cM\_L} \cdot \frac{M_{LUM}}{M_{oM}^2} \cdot \theta_{Ms\_L} \quad (7)$$

Model controller 1 has corrective quantity calculator $3_U$ which is supplied with model torsion angle $\theta_{Ms\_L}$ for calculating model corrective torque $T_{comp\_U}$ based on equations (6), (7). As a result, final model motor acceleration command $U_{FF\_U}$ is expressed by:

$$U_{FF\_U} = U_{Mref\_U} + T_{comp\_U} \quad (8)$$

Model corrective torques $T_{comp\_L}$, $T_{comp\_U}$ thus determined are based on the fact that the speed loops of feedback controllers $10_L$, $10_U$ are a proportional (P) control loop. However, it is possible to determine corrective torques according to a proportion-plus-integral (PI) control loop for compensation.

In this embodiment, after interference torque correction has been carried out by model controller 1, standard state quantities are applied as commands to feedback controllers $10_L$, $10_U$. Therefore, the robot arms are not affected by interference from the other axes.

INDUSTRIAL APPLICABILITY

According to the present invention, as described above, in a robot control device for use in controlling a multiaxial robot with a mechanism having spring elements between electric motors of respective axes and robot arms, interfering forces received from other axes are corrected by a model controller, and, based on the corrected interfering forces, standard state quantities are applied to feedback controllers, so that no noise component will be added to corrective torques and the robot arms will be free of interference-induced vibrations, thereby increasing the path precision of a tool tip.

What is claimed is:

1. A method of controlling, as an object to be controlled, a multiaxial robot with a mechanism having spring elements between electric motors of respective axes and robot arms, comprising the steps of:

providing a pseudo-model of said object to be controlled and a feedback control system for said object to be controlled;

calculating model motor position commands, model motor speed commands, and model feed-forward commands for the respective axes, using said pseudo-model, upon being supplied with position commands for the respective electric motors;

determining interfering torques due to interference acting between the axes from the other axes, using said pseudo-model, and calculating model corrective torques to cancel said interfering torques;

adding said model corrective torques to said model feed-forward commands to produce final model motor acceleration commands; and executing a feedback control process for said axes depending on said model motor position commands, said model motor speed commands, and said final model motor acceleration commands.

2. A method according to claim 1, wherein said interfering torques are calculated from model torsion angles which are positional differences between model electric motors and model robot arms.

3. A device for controlling a multiaxial robot with a mechanism having spring elements between electric motors of respective axes and robot arms, comprising:

a model controller for being supplied with position commands for the respective electric motors and calculating model motor position commands, model motor speed commands, and model feed-forward commands for the respective axes; and a feedback controller for actuating and controlling the electric motors and the robot arms based on the commands outputted from said model controller;

said model controller having corrective quantity calculators for determining interfering torques due to interference acting between the axes from the other axes and calculating model corrective torques to cancel said interfering torques, whereby said model controller outputs said model feed-forward commands with said model corrective torques added thereto.

4. A device according to claim 3, wherein said corrective quantity calculators calculate said interfering torques from model torsion angles which are positional differences between model electric motors and model robot arms.

5. A device according to claim 3, further comprising:

state observers associated with the respective axes for predicting torsion angles and angular velocities of torsion based on actual motor positions and motor acceleration commands outputted from said feedback controllers; wherein said model controller calculates model torsion angles and model angular velocities of torsion; and said feedback controllers output said motor acceleration commands taking into account the differences between the predicted torsion angles and said model torsion angles and the differences between the predicted angular velocities of torsion and said model angular velocities of torsion.

* * * * *